United States Patent [19]

Bernier

[11] Patent Number: 4,652,191

[45] Date of Patent: Mar. 24, 1987

[54] PRESS ROUTER

[76] Inventor: Lucien Bernier, 570 Citation Way, Thousand Oaks, Calif. 91360

[21] Appl. No.: 825,974

[22] Filed: Feb. 4, 1986

[51] Int. Cl.[4] .......... B23C 1/20; B25F 5/00

[52] U.S. Cl. .......... 409/182; 51/170 T; 144/134 D; 144/136 C

[58] Field of Search .......... 409/181, 182; 144/134 R, 134 A, 134 D, 136 C, 136 D, 136 E; 51/170 T, 170 R

[56] References Cited

U.S. PATENT DOCUMENTS

| | | | |
|---|---|---|---|
| 1,581,719 | 4/1926 | Carter | 409/182 |
| 1,874,232 | 8/1932 | Groene et al. | 409/182 |
| 3,466,973 | 9/1969 | Rees | 409/182 |
| 4,102,370 | 7/1978 | Vess | 409/182 X |
| 4,239,428 | 12/1980 | Berzina | 409/182 |
| 4,319,860 | 3/1982 | Beares | 409/182 |
| 4,488,383 | 12/1984 | Zerbe | 144/134 D |
| 4,562,872 | 1/1986 | Fushiya et al. | 409/182 X |

*Primary Examiner*—William R. Briggs

*Attorney, Agent, or Firm*—Arthur F. Zobal

[57] ABSTRACT

The press router has a base and a frame for receiving a router motor assembly including a router cutting tool. A movable rack supported by the frame is coupled to the router motor assembly. A pinion supported by the frame engages the rack and is rotatable by a feed handle for moving the rack and hence the router motor assembly up or down. Rollers supported by the frame engage the router motor assembly in the opening of the frame. The router motor assembly can be dynamically advanced when powered. A clutch in the feed handle allows the feed handle to be disengaged from the pinion and rotated relative to the pinion to a comfortable position for gripping by the operator. An incremental advance sub-assembly is provided in the feed handle to allow the operator to incrementally advance the router motor housing and cutting tool. A return to start sub-assembly is provided in the feed handle to allow the operator to vary the start position of the router motor housing. A depth gage assembly is coupled to the router motor housing to accurately control the depth of cut. A warning light is provided to indicate to the operator when the pre-set depth of cut approaches. In additon a fixture is provided for aligning a template guide relative to the router cutting tool.

11 Claims, 19 Drawing Figures

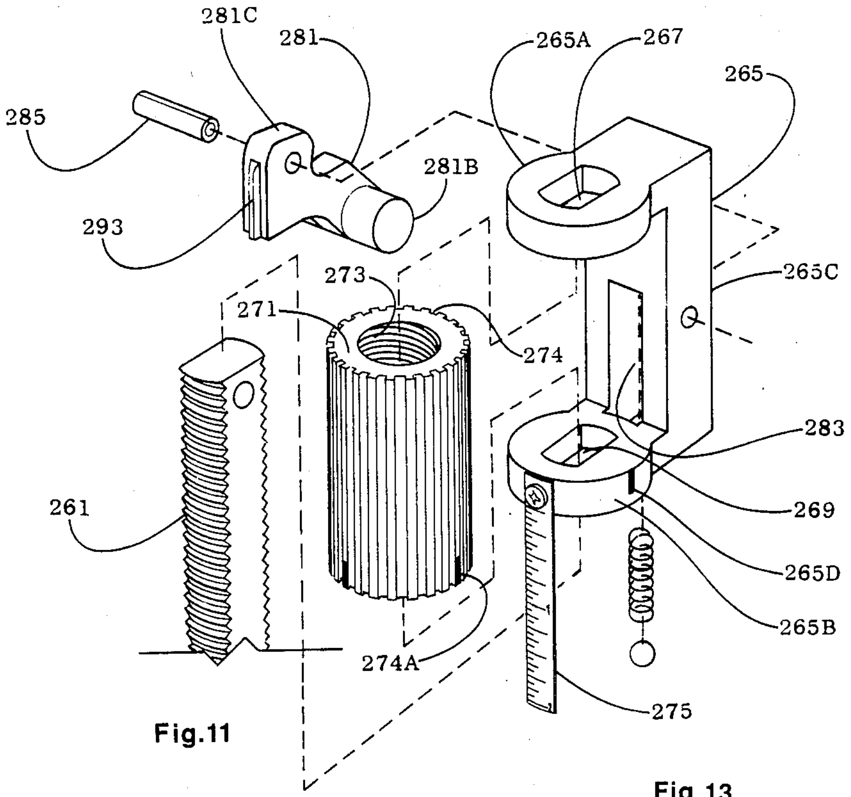
Fig.11
Fig.13
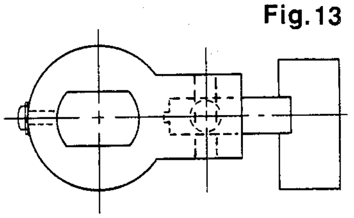
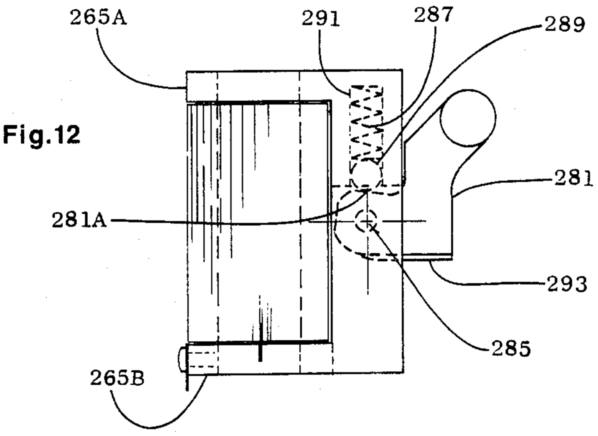
Fig.12

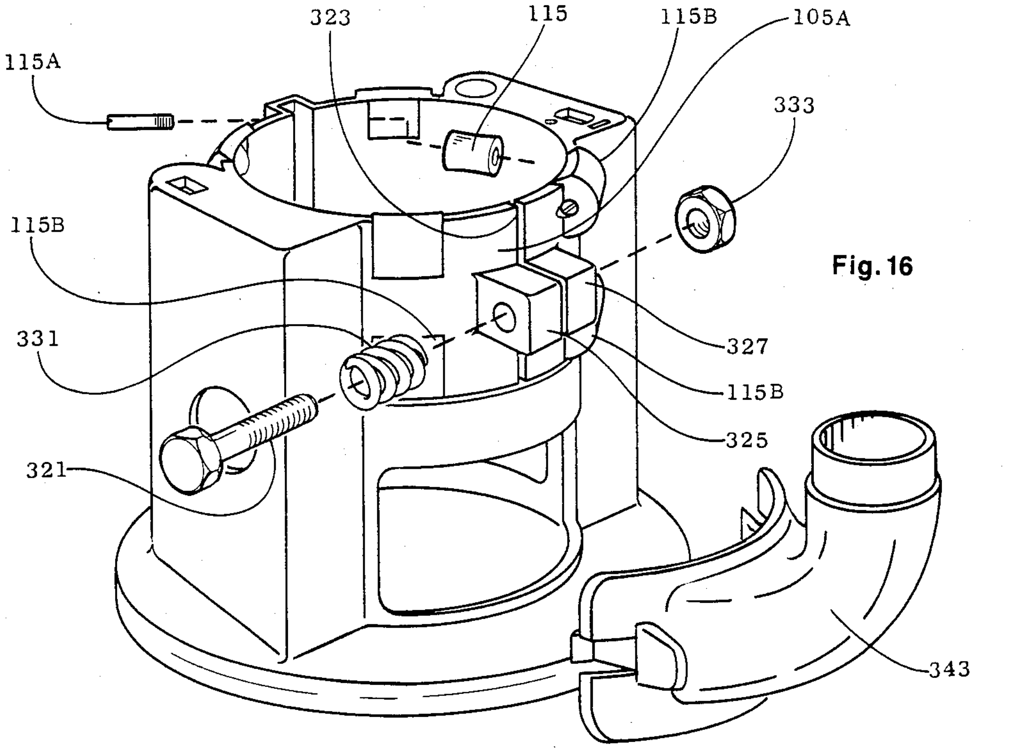
Fig. 16
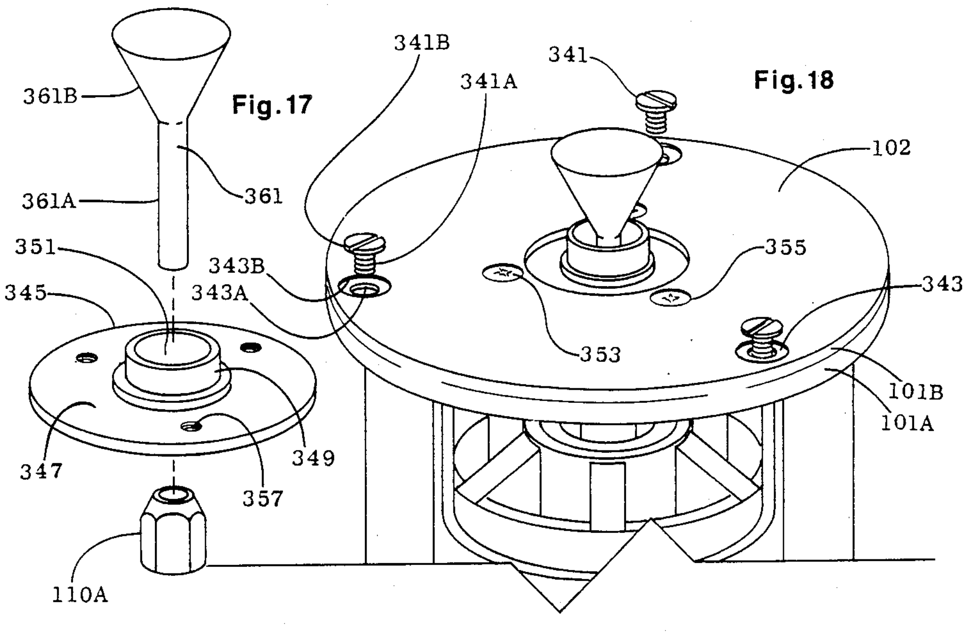
Fig. 17
Fig. 18

PRESS ROUTER

BACKGROUND OF THE INVENTION

Field of Invention

This invention relates to a portable press router assembly.

Summary of the Invention

It is an object of the invention by a new and useful portable press router assembly which has many features in its frame and feed handle which make it a very convenient and easy to use tool. The portable router assembly comprises a base and a frame having an opening for receiving a router motor assembly including a router cutting tool. Means is provided for guiding movement of the router motor assembly in opposite directions in the opening of the frame. Roller means are coupled to the frame for engaging the housing of the router motor assembly for facilitating movement of the router motor assembly in the opening of the frame. Rack means is connected to the router motor assembly and a rotatable pinion is supported by the frame for engaging said rack means, for moving said rack means and hence the router motor assembly in the opening. A handle is coupled to said pinion for allowing an operator to rotate the pinion for operating the router motor assembly in the frame.

A stationary shaft is connected to the frame and extends transversely therefrom. A tubular member is connected to the pinion and is located around the stationary shaft for rotation. A clutch sub-assembly is provided for coupling the handle to the tubular member for allowing the handle to rotate the tubular member and hence the pinion and for uncoupling the handle from the tubular member to allow the handle to be rotated relative to the tubular member and hence relative to the pinion.

The stationary shaft extends through the tubular member and has a ratchet gear connected thereto which does not rotate. A double pawl arm is pivotally coupled to a a ratchet "on" - "off" support arm for engaging the ratchet gear when controlled by a push button to allow incremental advance of the pinion as the handle is rotated to move the cutting tool outward from the frame and base to cutting positions. The support arm may be moved to an off position to disengage the double pawl rocking arm from the ratchet gear to disable the incremental advance feature, if desired by the operator.

The stationary shaft extends through the ratchet gear and through the ratchet "on" - "off" support arm and is connected to a stop which holds the components within the handle and is employed as part of a return to start subassembly. The return to start sub-assembly includes a key which is rotatable with respect to the outer portion of the handle. The key has a lug which extends through an aperture formed through the outer portion of the handle which can engage the stop. The outer portion of the handle comprises ratchet teeth and a spring loaded pawl is coupled to the key for engaging the ratchet teeth of the handle. The spring loaded pawl when depressed disengages the ratchet teeth and allows the key to rotate in opposite directions. The lug can be located in different positions relative to the handle to engage the stop at different positions to vary the return to start position.

The portable router assembly also comprises a depth gage shaft coupled to the router motor assembly for movement therewith relative to the frame. A depth gage assembly is movable on the depth gage shaft to different positions for controlling the depth of the cut desired. The depth gage assembly engages the frame when the depth of the cut desired is reached and prevents the router motor assembly from moving any further relative to the frame toward the base.

In another aspect, a before end of cut warning light assembly is provided. This assembly comprises a light and a switch which allows the light to be energized when the switch is actuated. In addition, a plunger moveable by the depth gage assembly is provided for actuating the switch when the depth gage assembly is near the frame.

BRIEF DESCRIPTION OF THE DRAWINGS

FIG. 11 is an exploded view of a depth gage assembly of the press router of the invention.

FIG. 12 is a side view of the housing of the depth gage assembly.

FIG. 13 is a top view of the housing of FIG. 12.

FIG. 16 is a partial exploded rear view of the frame of the invention.

FIG. 17 illustrates a template guide bushing-alignment fixture.

FIG. 18 illustrates the alignment fixture employed for aligning the template guide of the press router.

DESCRIPTION OF PREFERRED EMBODIMENT

Figure 1:
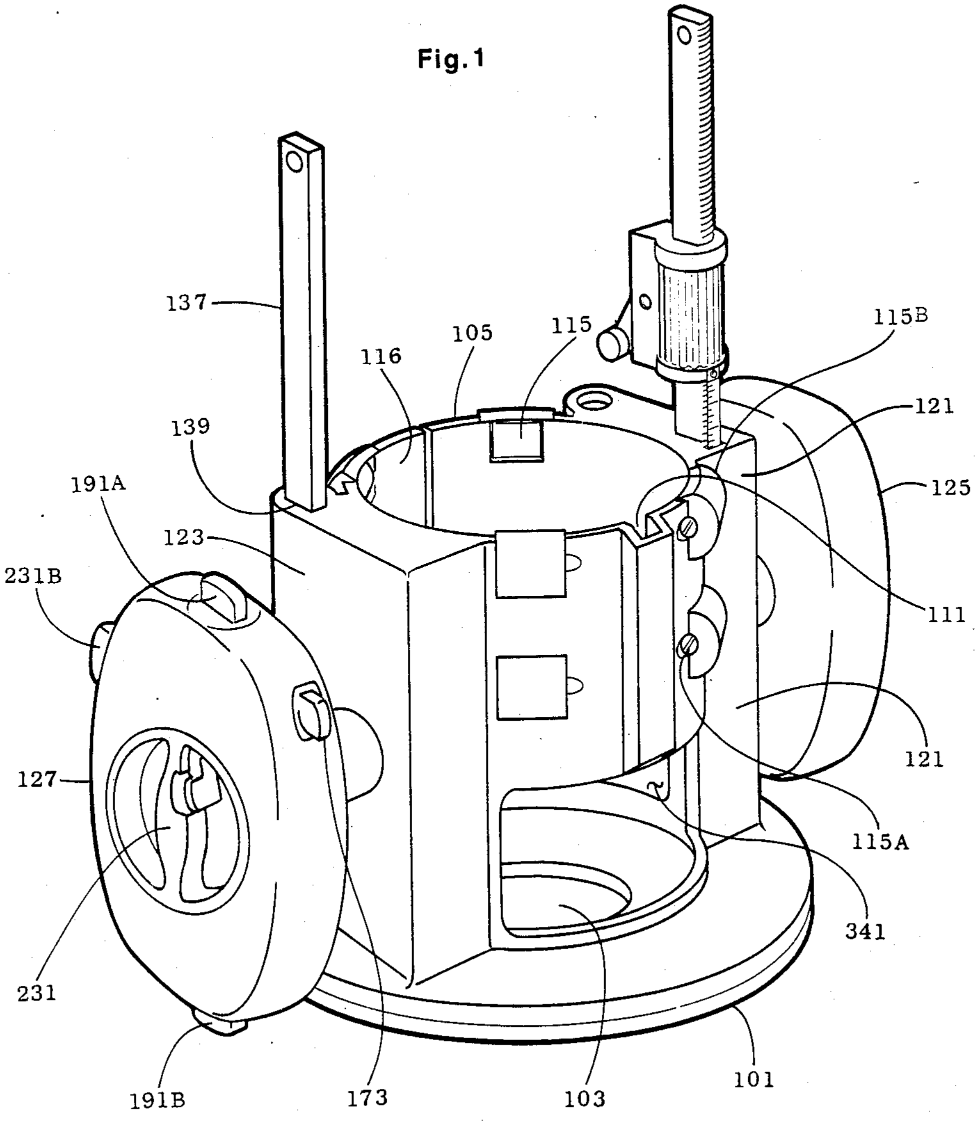
FIG. 1 is a perspective view of the base and frame of the press router of the invention.
Figure 2:
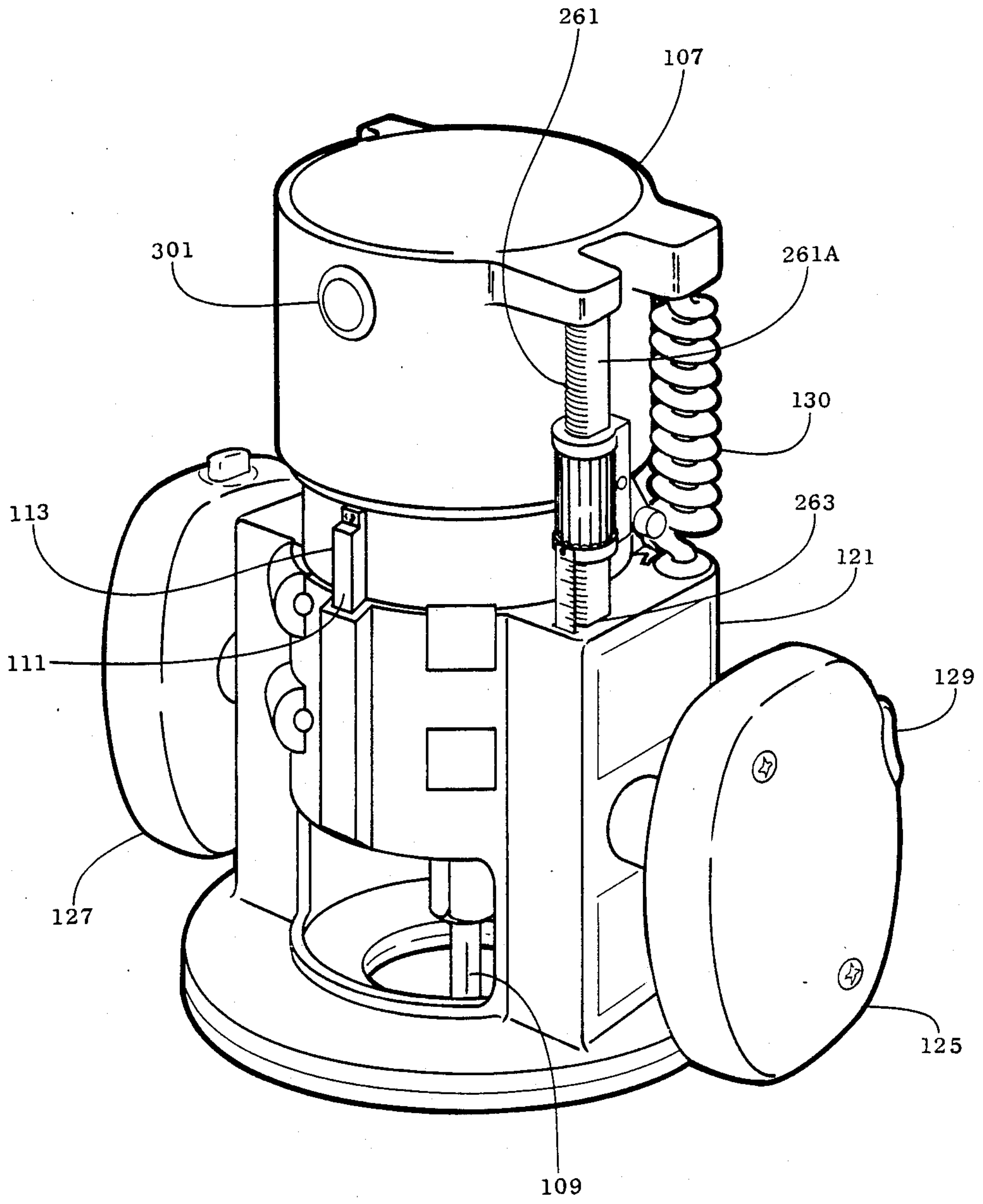
FIG. 2 is a different angular view of the base and frame of FIG. 1 with a router motor assembly located in the frame.
Figure 3:
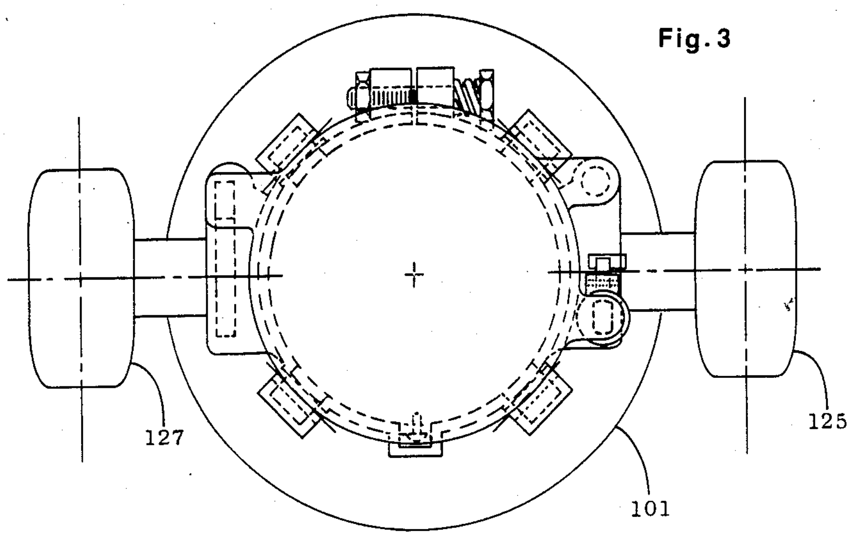
FIG. 3 is a top plan view of FIG. 2.
Figure 4:
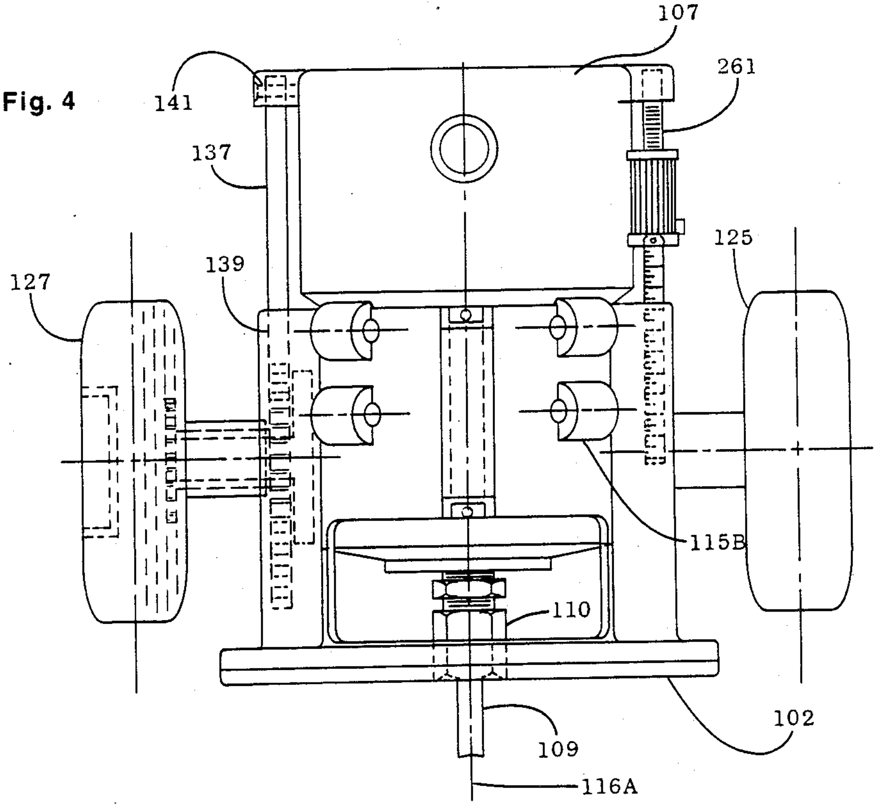
FIG. 4 is a side view of FIG. 2.
Figure 5:
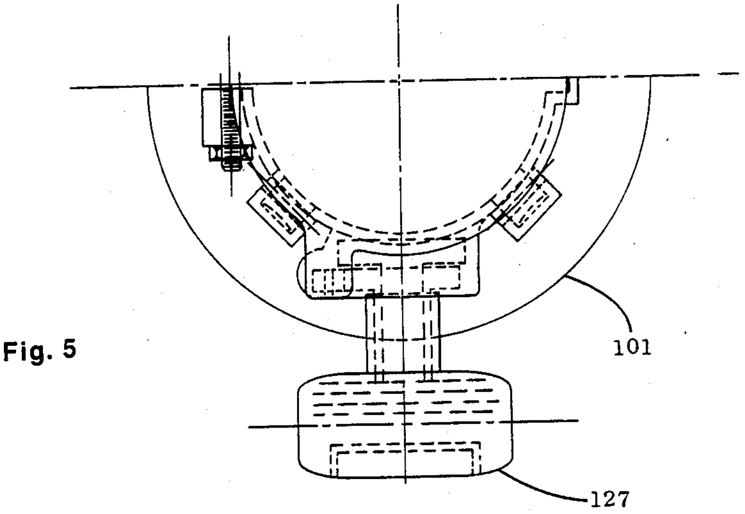
FIG. 5 is a top plan view of a portion of FIG. 3 illustrating more details of the feed handle.
Figure 6:
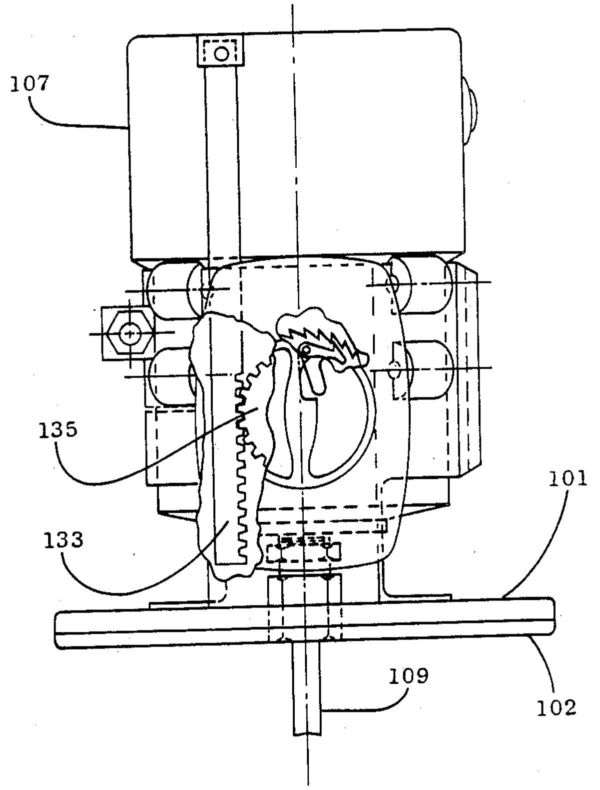
FIG. 6 is a side view of FIG. 2 from the side of the feed handle with portions in cross-section.
Figure 7:
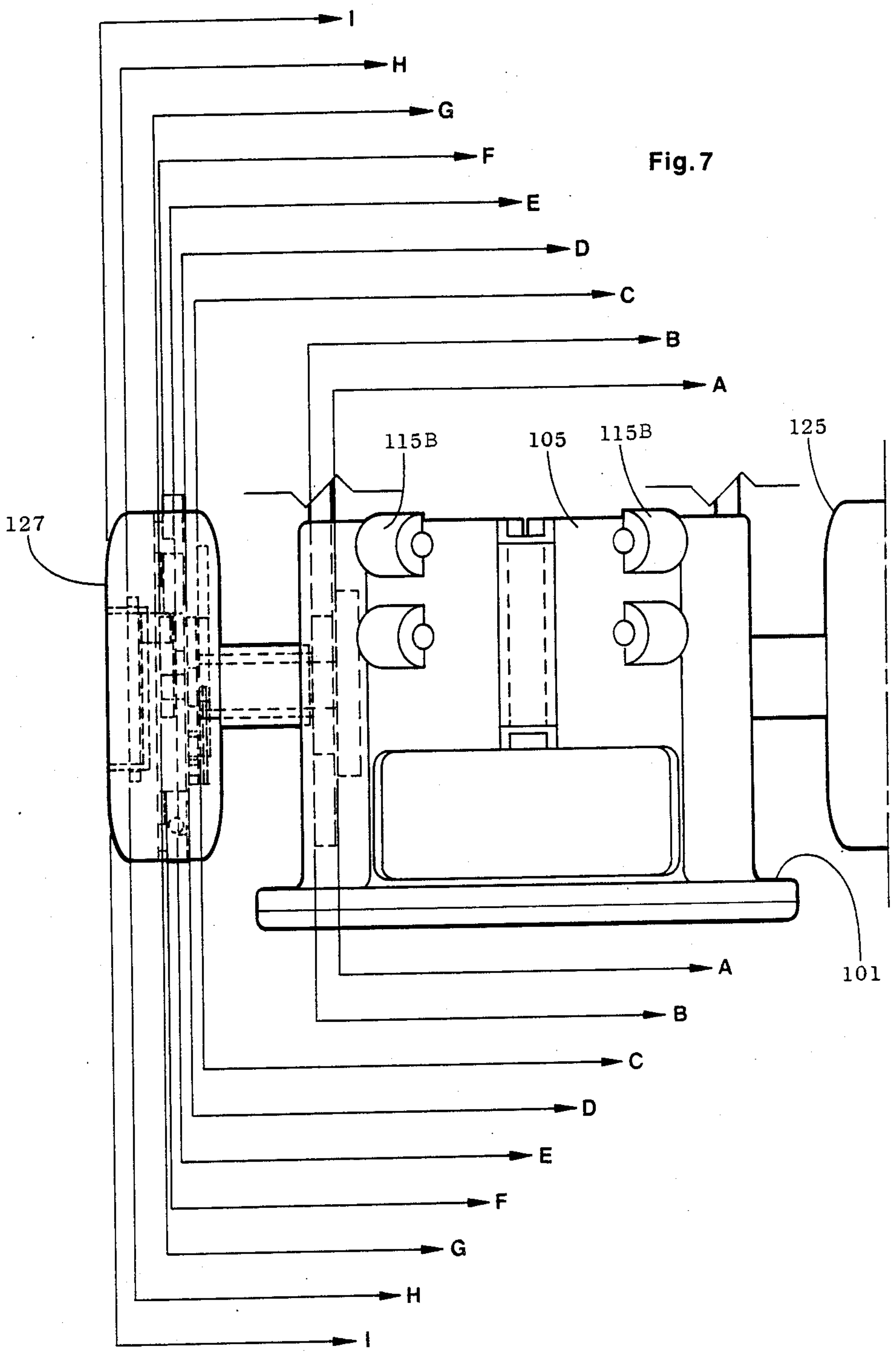
FIG. 7 is a side view of the frame and base of FIG. 1 illustrating nine cross-sectional lines through the feed handle.

Referring to the drawings, there is disclosed a circular router base 101 having a flat bottom surface 102 adapted to be placed on a workpiece to be worked on. The router base 101 has a central circular opening 103 and a upper hollow cylindrical cradle or frame 105 having a central opening 116 for supporting a router motor assembly 107 such that the motor assembly 107 may be moved upward or downward in the opening 116 of the frame 105 along its axis 116A while its cutting tool 109 is rotating. The base 101, frame 105, and motor assembly 107 form a portable press router tool for routing and edge shaping. The cylindrical frame 105 has a vertical slot 111 for receiving a key 113 attached to the side of the motor assembly 107 for guiding vertical movement of the motor assembly 107 in the frame 105. The frame 105 also supports a plurality of rollers 115 which engage the outer housing of the motor assembly 107 and allow the motor assembly to roll on the rollers during vertical movement thereof and hence allow a true vertical reciprocating movement of the motor housing assembly which drives the cutting tool 109. The rollers 115 are supported for rotation on pins 115A about horizontal axes in apertures 117 formed in the wall of the frame 105. The outer sides of the rollers 115 are enclosed by housings 115B. Part of the rollers extend into the central opening 116 for engaging the outside of the housing of the motor assembly 105. In the embodiment disclosed, there are four pairs of rollers 115 with the vertical center lines of adjacent pairs spaced 90° apart.

The frame 105 has two structural members 121 and 123 on opposite sides. The press router has two handles 125 and 127 used to hold and control the machine. The right side handle 125 is the router power control handle and is stationary. It is connected to member 121 and has a switch 129 for controlling electrical power applied to the electric motor of the assembly 107. An electrical lead 130 is shown extending from the member 121 to the motor assembly 107.

Figure 8:
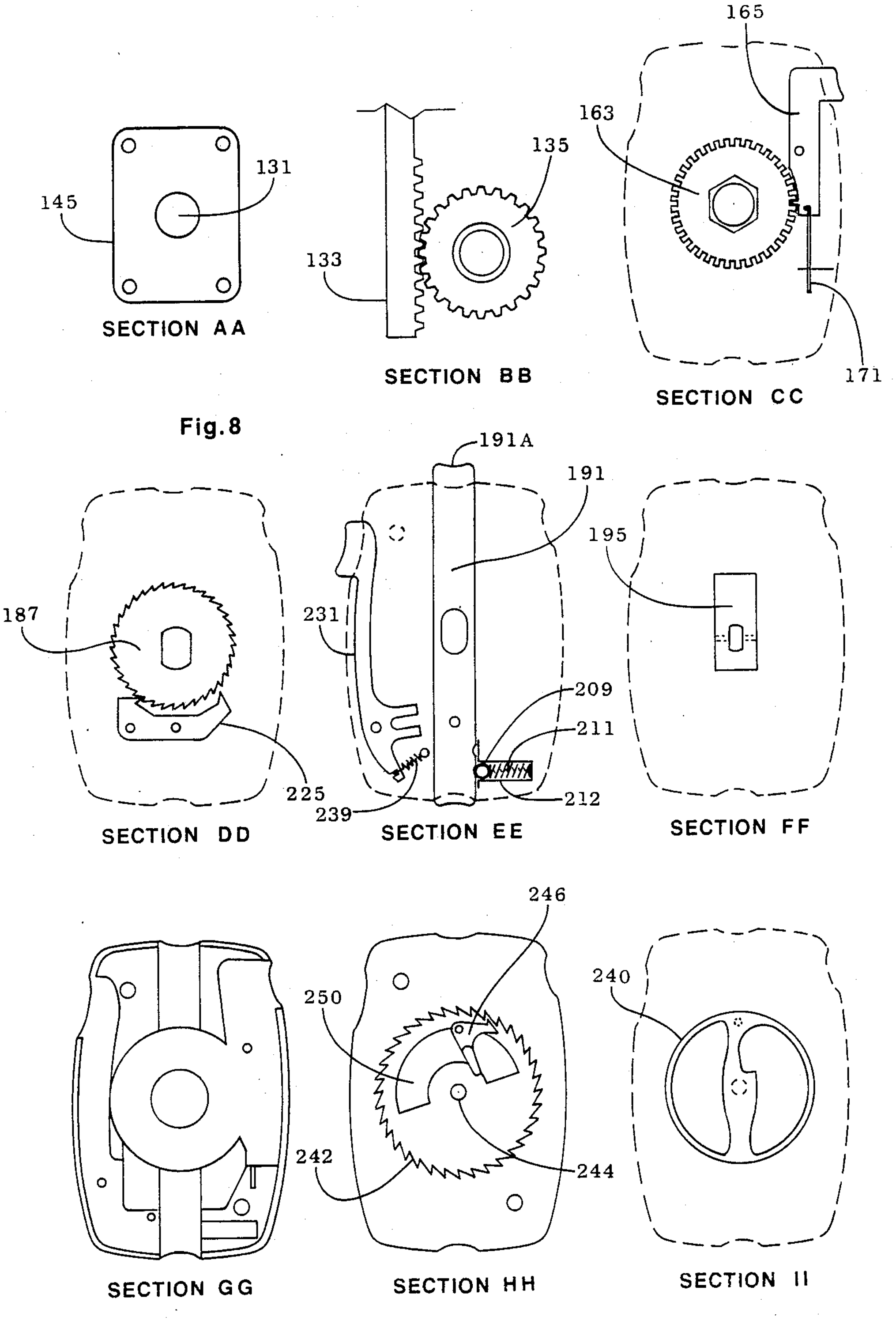
FIG. 8 illustrates nine views of the feed handle as seen from the nine cross-sectional lines of FIG. 7.

The left side handle 127 is the router feed handle. It has seven sub-assemblies which perform separate functions. The seven sub-assemblies are illustrated in FIG. 8AA, 8BB, 8CC, 8DD, 8EE, 8FF and 8HH. The handle is rotatable on a supporting shaft 131 which is affixed to member 123 of the frame 105. The rotating movement of the feed handle 127 is converted into a vertical linear movement by a rack 133 and pinion 135 assembly to move the motor assembly 107 up or down. The rack 133 is formed at the lower end of a bar 137 which is slideable vertically in an aperture 139 formed in the member 123 of the frame 105. The upper end of the bar 137 is connected to the top of the motor assembly 107 by a bolt 141. As the rack 133 and hence the bar 137 are moved upward or downward, they move the motor assembly 107 upward or downward. By turning the handle 127 counter clockwise (FIG. 9), the cutting bit 109 can be advanced in depth during a cutting operation without stopping the router motor. The cutting bit 109 can be retracted upward beyond the resting surface 102 of the router base 101. This promotes safety. Once in place, the router motor can be powered to rotate the bit and the rotating bit can be lowered with the feed handle 127.

The pinion 135 is connected to a tubular member 143 both of which are rotable on the fixed shaft 131. The rack 133 can be moved upward or downward by rotating the pinion 135 in opposite directions. The inner end of the fixed shaft 131 is connected to a plate 145 which is attached by bolts 147 to the inside wall of member 123. Both the shaft 131 and tubular member 143 extend outward through an aperture formed through the wall of the member 123. The feed handle 127 is connectable to the tubular member 143 for rotating the pinion 135 to move the motor assembly 107 up or down in the frame 105.

The feed handle 127 is formed of two parts 127A and 127B which are attached together by bolts 151. Part 127A has a central aperture 153 and a tubular extension 155 which fits around tubular member 143 with the outer end 157 of tubular member 143 extending through aperture 153. The outer end 157 of tubular member 143 has a hexagon shaped key 159 which fits into a hexagon shaped aperture 161 formed in a clutch gear 163. Thus, the clutch gear 163 rotates with the pinon 135. A clutch pawl 165 is pivotally coupled to a pin 167 formed on the inside of the handle part 127A. The pawl 165 has a detent 169 which normally is urged against the teeth of the gear 163 by a spring 171 and hence locks the handle 127 to the clutch gear 163 whereby when the handle 127 is rotated, it rotates gear 163 and pinion 135 causing the rack 133 to be moved up or down depending on which direction the handle 127 is rotated.

The handle 127 can be released from the gear 163 allowing it to rotate on the tubular member 143 relative to the gear 163 and pinion 135 by pushing inward on a button 173 connected to the end of the pawl 165. This moves the detent 169 away from the teeth of gear 163 and allows the operator to rotate the handle 127 relative to the pinion 135 to a position which is comfortable to the user's hand. When this position is reached, the pawl 165 can be released allowing the spring 171 to urge the detent 169 into engagement with the teeth of gear 163 whereby rotation of the handle 127 rotates the pinion 135. The button 173 extends outward through the handle 127 through an aperture 173A. The spring 171 engages the wall 127C of the handle part 127A to normally urge the detent 169 against teeth of the clutch gear 163.

The outer end of fixed shaft 131 has two keys 181 and 183 formed thereon and which extend beyond the outer end of the tubular member 143; through the aperture 153 of the handle part 127A; and through the aperture 161 of clutch gear 163. The key 181 fits into a mating aperture 185 formed through a ratchet gear 187 of a ratchet sub-assembly and the key 183 extends through an aperture 189 of a rocking arm support 191 of the ratchet sub-assembly and fits into a mating aperture 193 of a stop 195 of a return to start key sub-assembly. Thus the ratchet gear 187 and the stop 195 are fixedly secured to stationary shaft 131. A pin 196 extends through apertures 195A formed through the stop 195 and through an aperture 131A formed through the key 183 of the shaft 131 to hold the components together in the handle. A round portion 182 of the fixed shaft 131, between keys 181 and 183, fits into the aperture 189 of arm 191. The arm 191 can rotate with the handle 127 about the round portion 182 of the shaft 181 and can slide between ratchet 185 and end plate 195. The arm 191 can slide in the direction of its length, in slots 201 and 203 formed in the handle part 127A, a limited distance in either direction. The lower end of the arm 191 has two slots 205 and 207 for receiving a small ball 209 urged toward the arm 191 by a spring 211 which is located in a small aperture 212 (see FIG. 8EE) formed in wall 127D of the handle part 127A. The ball 209 and spring 211 hold the arm 191 in either of two positions determined by the position of the arm 191 and hence the position of the slots 205 and 207 relative to the ball. Normally the arm 191 will be at a position such that ball 209 fits in the slot 207.

The lower part of the arm 191 has an aperture 221 in which is pivotally located a pin 223 attached to a double pawl rocking arm 225 having pawls 225A and 225B for engaging the teeth of the stationary ratchet gear 187. A button 231 is pivotally coupled to the handle part 127A by a pin 233A which extends through an aperture 233 formed through the button 231. The button 231 has a slot 235 which fits around a second pin 237 of the arm 225 for pivoting the pin 237 and hence the arm 225 about the pin 223 for moving either of the pawls 225A or 225B into engagement with teeth of the ratchet gear 187. A spring 239 is connected to the end 231A of the button 231 and normally urges the slot 235 counterclockwise and hence the pawl 225B about the pin 223 clockwise into engagement with the teeth of the ratchet gear 187 and prevent a counterclockwise movement of the handle 127 and the pinion 135 thereby preventing downward movement of the rack 133. When the knob 231B of the button 231 is moved clockwise about its pivot point 233, it moves the slot 235 clockwise about pivot point 233 and hence the pin 237 counterclockwise about the pin 223 to move the pawl 225B away from the teeth of the ratchet gear. This allows the handle 127 to be rotated counterclockwise one half of a tooth space of gear 187 at which point pawl 225A engages one of the teeth of the gear and stops further counterclockwise movement of the handle as long as the knob 231B is held inward. When this knob 231B is released and allowed to be pulled counterclockwise about its pivot point 233 by the spring 239, the handle 127 can be rotated counterclockwise the remaining half of a tooth space until the pawl 225B engages the next tooth at which point further counterclockwise rotation of the handle is stopped. This arrangement allows for incremental advancement of the cutting tool. Successive small incremental depths of cut assures router's constant speed which results in a smooth and clean routing performance. The press router of the invention eliminates the many "stop-unlock-adjust-lock-reposition" router setting steps for each pass of a conventional router cutting operation. When moving the handle clockwise to move the cutting tool upward, the pawls 225A and 225B slip pass the teeth of the ratchet gear due to the shape of the teeth, and do not impede upward movement of the rack and cutting tool.

If it is desired not to use the incremental downward advance feature for the cutting tool, the operator can push inward on the end 191A of the arm 191 to move the slot 205 into engagement with ball 209. This moves the arm 225 completely away from the stationary ratchet gear 187 and hence disengages the double pawl rocking arm 225 from the ratchet gear whereby neither pawl 225A or 225B of the arm 225 can engage teeth of the ratchet gear 187.

In this position of the arm 191, the double pawl rocking arm fits into slot 127E of the handle portion 127A and the knob 231B of the button 231 is pulled flush with the handle 127 indicating to the operator that the incremental advance feature is not operational. In this position of the arm 191, the end 191B extends out beyond the handle a small distance. If the operator desires the incremental advance feature, he can push inward on the end 191B of the arm 191 to bring the slot 207 into engagement with the ball 209 and to engage the arm 225 with the ratchet gear 187 as mentioned above. In this position of the arm 191, the knob 231B extends out of the slot 127F indicating to the operator that the incremental advance feature is operational. Both ends 191A and 191B extend out beyond the handle a small distance for easy access thereto as shown in FIG. 1.

There now will be described a return to start position sub-assembly. This sub-assembly includes a return to start position key 240 which is located in a recessed portion 241 of the handle part 127B. The side walls of the recess 241 are indented at 242 to form teeth of a ratchet wheel. The key 240 is assembled in the recess 241 by a self-locking screw 243 which extends through an aperture 244 formed through the center of the inside wall 245 of the handle part 127B and is screwed to the key 240 to enable the key 240 to rotate freely. A spring loaded pawl 246 is pivotally coupled in a slot 247 of the key 240 by a bolt 248 to engage the teeth 242 of the ratchet of the handle part 127B. A spring 249 normally urges the pawl 246 against the teeth 242. When the pawl 246 engages the teeth of the ratchet, the key 240 cannot be rotated counterclockwise relative to the handle but can be rotated clockwise relative to the handle. The pawl's protruding lever 246A when depressed, disengages the pawl with the ratchet teeth and allows the key to freely rotate in the recess 241.

The backside of the key 240 has a lug 250 which protrudes through a moon-shaped orifice 251 formed through the inside wall 245 of the feed handle part 127B. The lug 250 is rotable by rotation of the key 240 and meets the stationary stop plate 195 when the handle 127 is rotated to a given position. The handle advance moves the lug away from the stop plate 195 and as the handle is returned, it is stopped at its starting position when the lug 250 of the key 240 meets the fixed stop plate 195 secured to the fixed shaft 131. The start position can be varied by releasing the pawl 246 and moving the key 240 to a different position. This feature has advantages in that it allows one to readily return the cutting tool to a given start position when it is moved upward and out of the work to be operated on providing more efficient operation of the machine.

In using the return to start position key, at the maximum height of the cutting tool in the machine, the key 240 will be positioned relative to the handle such that its lug 250 engages the stop 195. As the handle 127 is rotated counterclockwise to move the cutting tool down, a new start position below the maximum height may be desired. This can be achieved by rotating the key 240 clockwise relative to the handle when the handle 127 is at a position corresponding to the start position until the lug 250 engages the stop 195. The handle 127 then can be rotated further counterclockwise to move the tool downward for cutting and operating purposes. When the handle 127 is rotated clockwise to move the cutting tool upward, clockwise rotation of the handle will be stopped when the lug 250 of the key 240 engages the stop 195 at the new start position. If a higher start position subsequently is desired, the key 240 can be rotated counterclockwise relative to the handle 127 to reposition the lug 250 to allow the cutting tool to be moved further upward. Counterclockwise rotation of the key 240 relative to the handle 127 can be achieved by depressing the lever 246A of the pawl 246 to disengage the pawl 246 from the ratchet teeth.

There is provided a depth gage assembly which may be expediently adjusted to set precisely the depth of a router cut. As shown in FIGS. 1–4 and 11–14, the depth gage assembly comprises a threaded depth gage shaft 261 having its upper end 261A connected to the router motor housing 107. Its lower end slides in an aperture 263, formed in member 121 of the frame 105. The shaft 261 has two flat sides. A C-shaped gage housing 265 is provided which has two apertures 267 and 269 formed in its arms 265A and 265B which freely receive the shaft such that the housing 265 can slide on the shaft 261 without rotation. A cylindrical thumb nut 271 is provided having internal threaded 273 which mate with the threads of shaft 261 such that the nut 271 can be rotated on the shaft 261 to move it upward or downward. The nut 271 has a plurality of parallel external grooves 274. The nut 271 is located on the shaft 261 between the arms 265A and 265B of the housing 265. A measuring scale 275 has its upper end connected to the arm 265B of the housing 265. The lower end of the scale 275 is slidable in an aperture 277 formed in member 121 of the frame 105. A spring loaded snap "on" and snap "off" lock 281 is provided for locking the thumb nut 271 in place. The lock 281 is located in an aperture 283 formed through the base 265C of the housing and is pivotally coupled therein by a pin 285. A spring 287 and a ball 289 located in aperture 291 formed in the housing normally holds the lock 281 either in an unlocked position as shown in FIG. 12 or in a locked position. In the unlocked position, the ball 289 engages surface 281A of the lock. The handle 281B of the lock 281 can be pivoted clockwise as shown in FIG. 12 to bring a key 293 formed on the lock into one of the grooves 274 fo the nut 271 to lock it in place. In the locked position, the ball 289 engages surface 281C of the lock 281.

In using the depth gage assembly, the motor assembly 107 is moved to its highest position, and with the lock 281 in its off position, the nut 271 is rotated downward to the desired position as determined by the scale 275. The lock 281 then is moved to its on position to lock the nut 271 in place. When the motor assembly 107 and cutting tool 109 are moved downward, movement will stop when the bottom of the housing 265 engages the top of member 121. At this position the maximum depth of the bit 109 in the stock will have been reached. The thumb nut 271 in one embodiment has ⅜"—16 thread. It may be spun for a fast advance yet the nut has four index references 274A to allow a gage setting against 265D to a tolerance of less than one-one hundred and twenty-eight of an inch (1/128").

Figure 14:
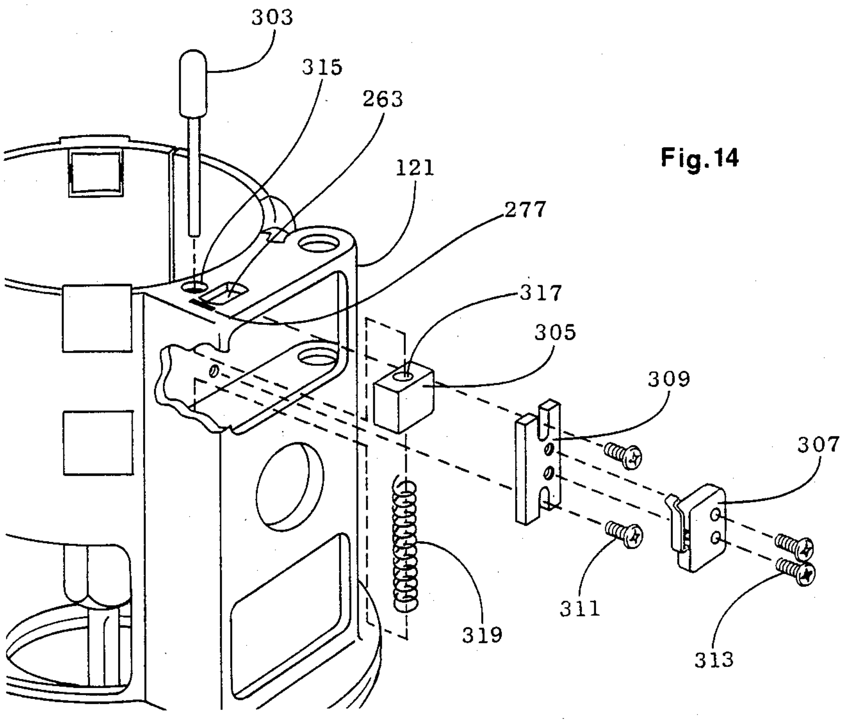
FIG. 14 is an exploded view of a before end of cut warning light assembly.
Figure 15:
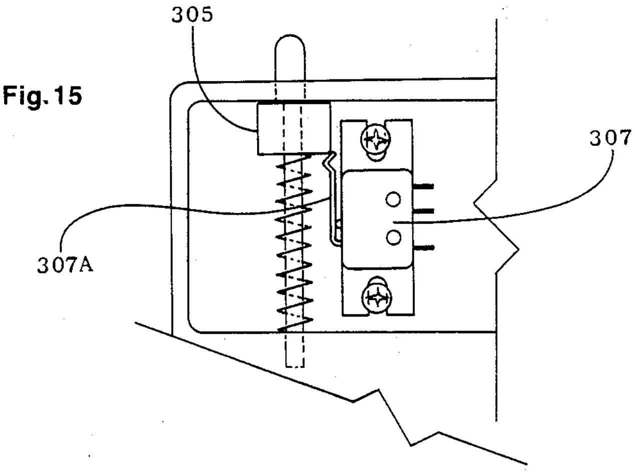
FIG. 15 illustrates in more detail the plunger and micro-switch of the assembly of FIG. 14.

The press router of the invention induces a faster advance of the router which slows the RPM of the machine with the result of a rough cut. A warning light 301 is provided which is triggered one eighth of an inch before the end of the cut. This warns the operator before the end of the cut such that he is able to slow down the advance of the router and increase the RPM of the equipment to obtain a quality cut. Referring to FIGS. 14 and 15 a spring loaded plunger 303 and lug 305 are pushed downward by the bottom of the housing 265 of the depth gage assembly to close a micro switch 307 to turn on the light 301 one-eighth of an inch before the end of the cut. A slotted mounting plate 309 is attached on the inside of member 121 by bolts 311. The switch 307 is attached to the plate 309 by bolts 313. The plunger 303 is located in holes 315 formed in member 121 and extends through a hole 317 formed through lug 305. A coil spring 319 is located around the lower shank of the plunger 303 and urges it upward. When the lug 305 is moved downward by the head of the plunger it moves an arm 307A of the switch 307 to close the switch and to apply electrical current to the light 301.

The housing skirt clamp bar or key 113 attached to the motor housing slides in a vertical slot or channel 111 formed in the frame 105 to prevent the router motor assembly from rotating in the frame 105 when it is driven up and down.

Referring to FIG. 16, the upper rear portion 105A of the frame 105 is split at 321 and 323 and holds four rollers 115 which are pressed on the motor housing located in the frame. The frame portion 105A has two lugs 325 and 327 with holes formed therethrough. The hole in lug 327 is threaded. A bolt 329 is located through a coil spring 331, slidably located through the hole formed through lug 325 and screwed through the hole of lug 327 to adjust the spring tension. A nut 333 is screwed to the end of the bolt 329.

A working light is located inside of the frame at 341 in the right hand side as shown in FIG. 1. A dust sweep intake adaptor 343 to be used with the router with a vacuum system is shown in FIG. 16.

Referring to FIGS. 17 and 18 there will be described the alignment fixture employed for aligning a template guide of the press router. The base 101 of the router comprises an upper base member 101A and a lower base member 101B attachable to the base member 101A by three pan head screws 341. Base member 101B has three holes 343 for receiving the screws 341 for allowing them to be screwed into threaded holes (not shown) formed in base member 101A. Each hole 343 is T-shaped in cross-section and comprises a smaller diameter portion 343A for receiving the shank 341A of one of the screws 341 and a larger diameter portion 343B for receiving its head 341B. The hole portions 343A and 343B have diameters greater than the diameters of the shanks 341A and heads 341B respectively of the screws 341 to allow lateral movement of the base member 101B relative to base member 101A until the screws 341 are screwed in tight to the base member 101A and against the base member 101B. When screwed tightly in place the heads 341B of the screws 341 do not extend beyond the lower surface 102 of the base member 101B.

A template guide bushing 345 is provided comprising a disc portion 347 and a cylindrical portion 349 having a cylindrical aperture 351 extending therethrough, through which the bit of the router may extend. In the normal use of the template guide member 345 it is attached to the upper or inner side of the base member 101B by flat head screws 353 with the cylindrical guide portion 349 extending outward beyond the surface 102 of base member 101B such that it may engage a template edge for guiding the bit of the router. When screwed in place, the heads of the screws 353 do not extend beyond the surface 102 of the base portion 102B. The template guide bushing is assembled to the router base member 101B in its fixed position with three flat head screws 353 screwed into apertures 357 of disc portion 347 through apertures 355 formed through base member 101B.

In accordance with the invention, there is provided an aligning fixture 361 for aligning the cylindrical guide 349 concentrically with the bit of the router. The fixture 361 is of solid metal and comprises a cylindrical rod portion 361A with a conical portion 361B extending from one end. The maximum diameter of the conical portion 361B is greater than that of the aperture 351 of the cylindrical guide 349. The bit is removed from the router and the free end of the rod 361A of the fixture 361 is inserted in the chuck 110 of the router through the guide 349 and the collet 110A of the chuck is tightened. In this position, the fixture 361 extends through the cylindrical guide 349. The pan head screws 341 are loosened and the handle 127 is turned to move the fixture 361 into the router until the conical portion 361B engages the edge of the guide 341. Since the screws 341 are loosened and the guide bushing 345 and base member 101B can move laterally a limited amount relative to the base member 101A, the conical portion 361B will center the cylinder 349 relative to the fixture 361 and hence relative to the chuck. The screws 341 then are tightened to secure the base member 101B and hence the guide 349 to the base member 101A. The fixture 361 next is removed and a bit inserted into the chuck of the router whereby the cylindrical guide 349 will be centered relative to the bit.

Figure 9:
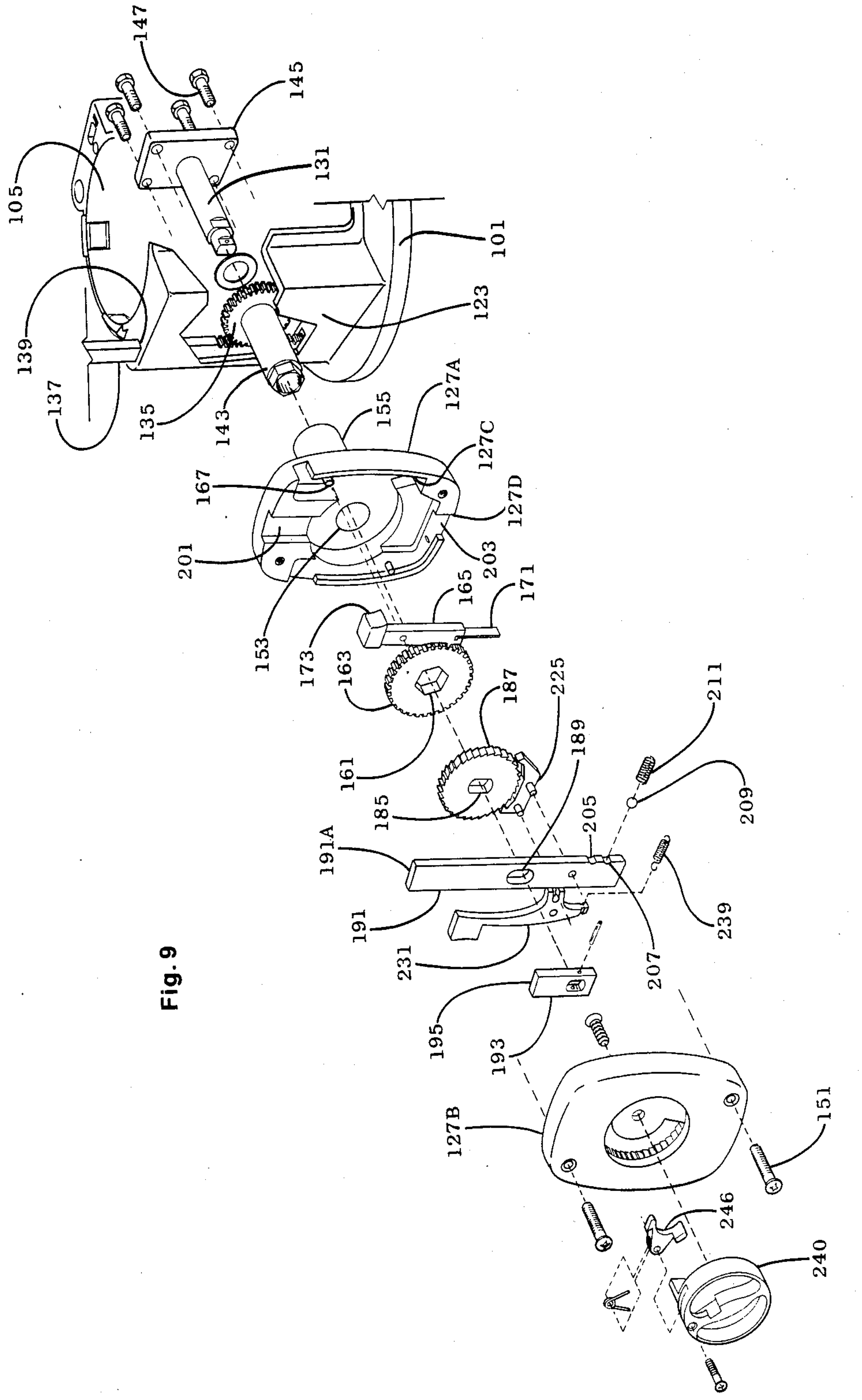
FIG. 9 is an exploded view of the components of the frame and feed handle of the invention.
Figure 10A:
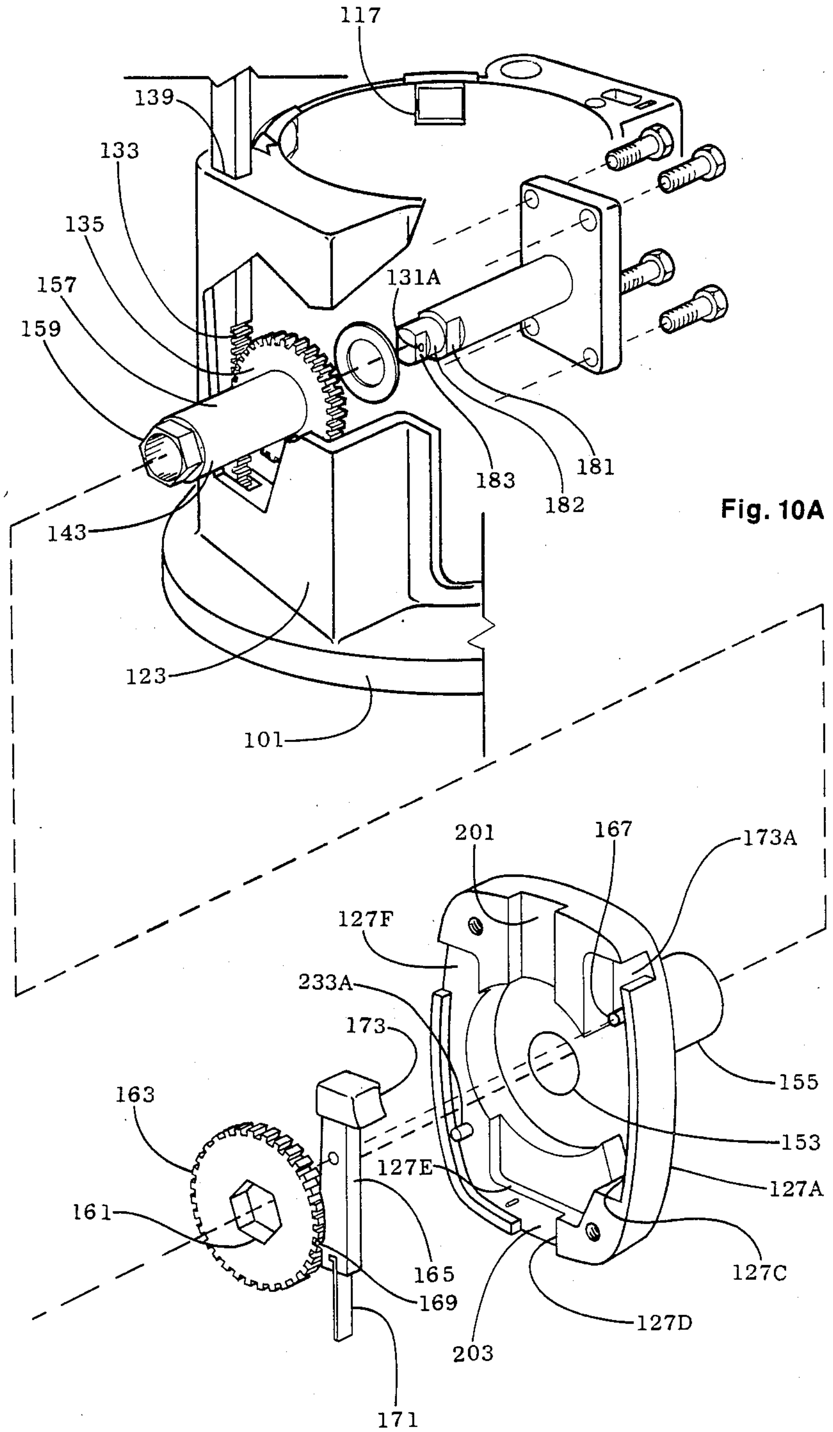
FIGS. 10A and 10B are an enlarged exploded view of the components of the frame and feed handle.
Figure 10B:
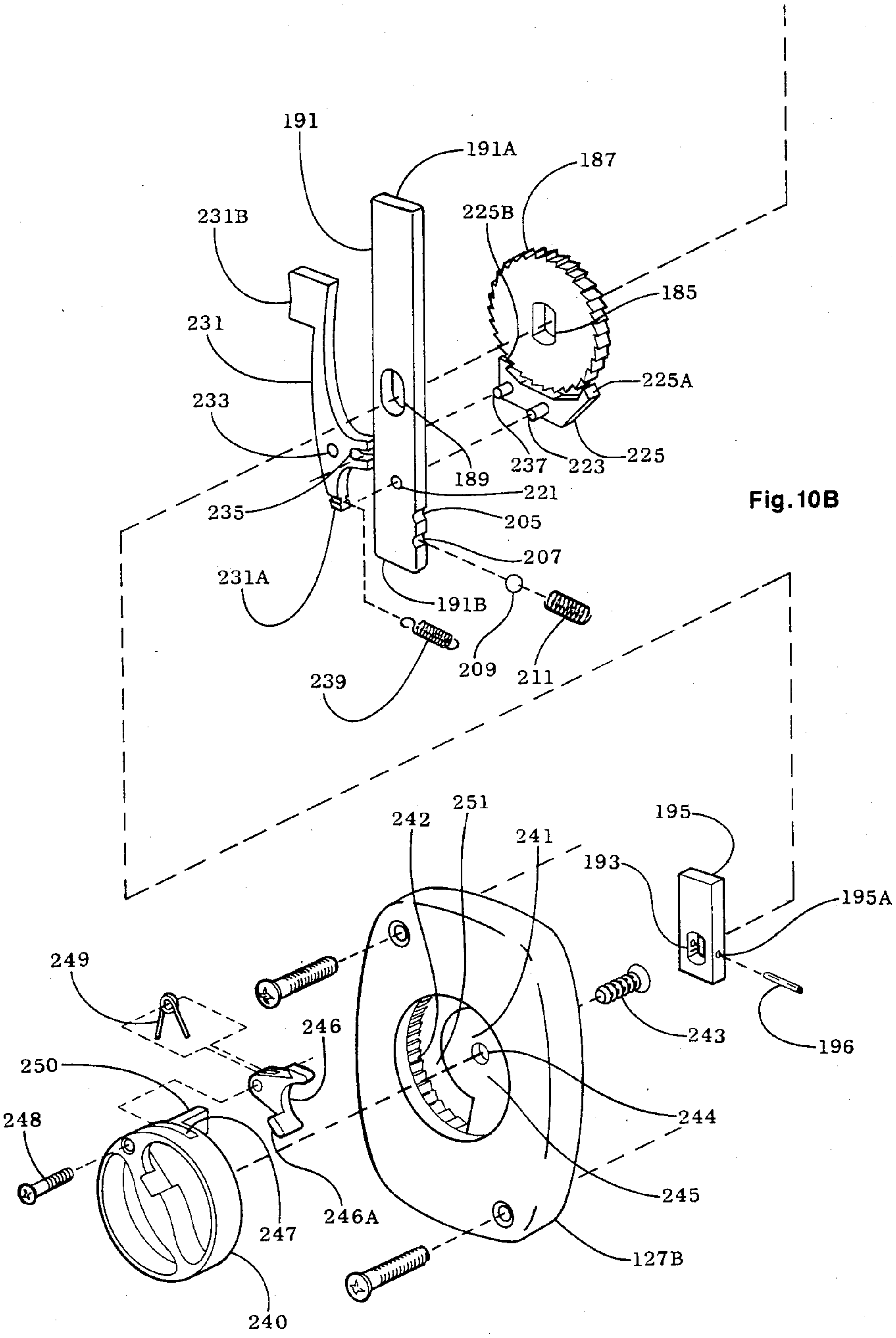

In the above description of the press router of the invention, reference is made to FIGS. 9, 10A and 10B when the terms clockwise and counterclockwise are used.

I claim:

1. A portable router assembly comprising:

a base having a flat surface adapted to be located on a work piece, said base having an aperture for receiving a router cutting tool, a frame connected to said base and having an opening for receiving a router motor assembly including a router cutting tool, said opening having an axis extending perpendicular to the plane of said flat surface of said base, said router motor assembly being adapted to be moved in opposite directions in said opening along said axis, means for guiding movement of said router motor assembly in said opening of said frame, roller means coupled to said frame for engaging the housing of said router motor assembly along said axis of said opening of said frame, rack means connected to said router motor assembly, said frame having means for supporting movement of said rack means in a direction parallel to said axis of said opening, a rotatable pinion supported by said frame for engaging said rack means, for moving said rack means and hence said router motor assembly in said opening of said frame along said axis, said pinion being adapted to be rotated in first or second opposite directions for moving the cutting tool of said router motor assembly outward of said aperture of said base or inward of said aperture of said base respectively, handle means coupled to said pinion for allowing an operator to rotate said pinion.

2. The portable router assembly of claim 1, comprising:

a stationary shaft connected to said frame and extending transversly from said frame, said pinion being located to rotate around said stationary shaft, a tubular member connected to said pinion and located around said stationary shaft for rotation around said stationary shaft, said handle means comprising an inner portion having an aperture for receiving said tubular member such that the outer end of said tubular member extends through said aperture, a clutch gear fixedly secured to the outer end of said tubular member, a clutch pawl pivotally coupled to said handle means and having a detent for engaging the teeth of said clutch gear, means for normally urging said detent of said clutch pawl into engagement the teeth of said gear such that rotation of said handle means in first or second opposite direction causes said pinion to rotate in said first or second opposite directions respectively, said clutch pawl being adapted to be pivoted relative to said handle means and relative to said clutch gear to disengage said detent from the clutch gear to allow said handle means to be rotated in either direction relative to said tubular member and hence relative to said pinion.

3. The portable router assembly of claim 2, wherein:

said stationary shaft extends through said tubular member and has a stationary ratchet gear connected to the outer end of said stationary shaft such that said ratchet gear does not rotate, an arm means supported for movement in said handle means in a direction transverse to the axis of said fixed shaft relative said handle means such that said arm means may be moved to first and second locations along said transverse direction, a double pawl rocking arm pivotally coupled to said arm, said double pawl rocking arm having first and second pawls which are adpated to engage the teeth of said stationary ratchet gear when said rocking arm is in first and second positions respectively and said arm means is in said first location, a control button pivotally coupled to said handle and having means engaging said rocking arm for moving said rocking arm to its first or second position, means for normally urging said control button in a direction for normally urging said first pawl of said rocking arm to said first position into engagement with the teeth of said stationary ratchet gear to prevent said handle and said pinion from rotating in said first direction when said arm means is in said first location, said control button being movable in a direction for moving said rocking arm to said second position for engaging said second pawl of said rocking arm with the teeth of said stationary ratchet gear whereby said handle and said pinion may be incrementally rotated in said first direction when said arm means is in said first location, when said arm means is in said second location said rocking arm being located in a position such that neither of said first and second pawls may engage the teeth of said stationary ratchet gear whereby said handle and said pinion may be freely rotated in said first or second directions.

4. The portable router of claim 3, wherein:

said stationary shaft has an end portion which extends through said stationary ratchet gear and through an aperture formed through said arm means such that said arm means may rotate around said end portion of said stationary shaft, a stop connected to said end portion of said stationary shaft such that said stop does not rotate, said handle means comprising an outer portion coupled to said inner portion with said clutch gear, clutch pawl, arm means, double pawl rocking arm control means and stop located between said inner and outer portion of said handle means, a key rotatably coupled to the outer side of said outer portion of said handle means for rotation relative to said handle means, a lug extending from the inner side of said key, said outer portion of said handle means having an aperture formed therethrough for receiving said lug whereby said lug may rotate in said aperture with said key and engage said stop, ratchet teeth supported by said outer portion of said handle means, a key pawl pivotally coupled to said key for engaging said ratchet teeth, means for normally urging said key pawl into engagement with said ratchet teeth to prevent said key from rotating in said first direction relative to said handle means but allowing said key to rotate in said second direction relative to said handle until said lug engages said stop to allow the operator to change the start position of the router motor assembly and hence of said cutting tool, said key pawl being movable out of engagement with said ratchet teeth such that key may be rotated in said first direction relative to said handle to allow the operator to reposition said lug.

5. The portable router assembly of claim 1, comprising:

a depth gage shaft coupled to said router motor assembly for movement therewith relative to said frame, depth gage means movable on said depth gage shaft to different positions depending on the depth of the cut desired, said depth gage means engaging said frame when the depth of cut desired is reached and preventing said router motor assembly from moving any further relative to said frame toward said base.

6. The portable router assembly of claim 5, comprising:

a warning light, a light switch or allowing said light to be energized when said switch is actuated, and plunger means movable by said depth gage means for actuating said switch when said depth gage means is near said frame.

7. The portable router assembly of claim 5, wherein:

said depth gage shaft has exterior threads, said depth gage means ecomprises a nut means having interior threads mating with said exterior threads of said depth gage shaft such that said nut means may be screwed on said depth gage shaft in opposite directions, a C-shaped member comprising a base with two spaced apart arms having apertures for slidably receiving said depth gage shaft with said nut means located between said two spaced apart arms, means for preventing said C-shaped member from rotating relative to said depth gage shaft, said nut means having exterior teeth parallel with its axis, and lock means supported by said C-shpaed member for engaging said teeth of said nut means for preventing said nut means from rotating relative to said depth gage shaft.

8. The portable router assembly of claim 5 wherein:

said base comprises an outer base member attachable to said base with threaded means, said threaded means allowing lateral movement of said outer base member relative to said base until said threaded means are secured in place, a hollow cylindrical template guide attachable to said outer base member for receiving the cutting tool of said router motor assembly, and a fixture for aligning said template guide with the chuck of said router motor assembly, said mixture comprising a cylindrical rod having a conical shaped member extending from one end, the other end of said rod of said fixture being adapted to be secured to the chuck of said router motor assembly with said fixture extending through said template guide whereby said fixture may be moved inward such that said conical shaped member will engage said template guide and center it relative to the chuck of said router motor assembly when said outer base member is movable lateraly relative to said base member at which point said threaded means may be secured in place and said fixture removed from the chuck of said router motor assembly.

9. A portable router assembly comprising:

a base, said base having an aperture for receiving a router cutting tool, a frame connected to said base and having an opening for receiving a router motor assembly including a router cutting tool, said router motor assembly being adapted to be moved in opposite directions in said opening, means for guiding movement of said router motor assembly in said opening of said frame, rack means connected to said router motor assembly, said frame having means for supporting movement of said rack means in said opposite directions, a rotatable pinion supported by said frame for engaging said rack means, for moving said rack means and hence said router motor assembly in said opening of said frame in said opposite directions, said pinion being adapted to be rotated in first or second opposite directions for moving the cutting tool of said router motor assembly outward of said aperature of said base or inward of said aperture of said base respectively, handle means coupled to said pinion for allowing an operator to rotate said pinion, a stationary shaft connected to said frame and extending transversly from said frame, said pinion being located to rotate around said stationary shaft, a tubular member connected to said pinion and located around said stationary shaft for rotation around said stationary shaft, said handle means comprising an inner portion having an aperture for receiving said tubular member such that the outer end of said tubular member extends through said aperture, a clutch gear fixedly secured to the outer end of said tubular member, a clutch pawl pivotally coupled to said handle means and having a detent for engaging the teeth of said clutch gear, means for normally urging said detent of said clutch pawl into engagement the teeth of said gear such that rotation of said handle means in first or second opposite direction causes said pinion to rotate in said first or second opposite directions respectively, said clutch pawl being adapted to be pivoted relative to said handle means and relative to said clutch gear to allow said handle means to be rotated in either direction relative to said tubular member and hence relative to said pinion.

10. The portable router assembly of claim 9, wherein:

said stationary shaft extends through said tubular member and has a stationary ratchet gear connected to the outer end of said stationary shaft such that said ratchet gear does not rotate, an arm means supported for movement in said handle means in a direction transverse to the axis of said fixed shaft relative said handle means such that said arm means may be moved to first and second locations along said transverse direction, a double pawl rocking arm pivotally coupled to said arm, said double pawl rocking arm having first and second pawls which are adpated to engage the teeth of said stationary ratchet gear when said rocking arm is in first and second positions respectively and said arm means is in said first location, a control button pivotally coupled to said handle and having means engaging said rocking arm for moving said rocking arm to its first or second position, means for normally urging said control button in a direction for normally urging said first pawl of said rocking arm to said first position into engagement with the teeth of said stationary ratchet gear to prevent said handle and said pinion from rotating in said first direction when said arm means is in said first location, said control button being movable in a direction for moving said rocking arm to said second postion for engaging said second pawl of said rocking arm with the teeth of said stationary ratchet gear whereby said handle and said pinion may be incrementally rotated in said first direction when said arm means is in said first location, when said arm means is in said second location said rocking arm being located in a position such that neither of said first and second pawls may engage the teeth of said stationary ratchet gear whereby said handle and said pinion may be freely rotated in said first or second directions.

11. The portable router of claim 10, wherein:

said stationary shaft has an end portion which extends through said stationary ratchet gear and through an aperture formed through said arm means such that said arm means may rotate around said end portion of said stationary shaft, a stop connected to said end portion of said stationary shaft such that said stop does not rotate, said handle means comprising an outer portion coupled to said inner portion with said clutch gear, clutch pawl, arm means, double pawl rocking arm control means and stop located between said inner and outer portion of said handle means, a key rotatably coupled to the outer side of said outer portion of said handle means for rotation relative to said handle means, a lug extending from the inner side of said key, said outer portion of said handle means having an aperture formed therethrough for receiving said lug whereby said lug may rotate in said aperture with said key and engage said stop, ratchet teeth supported by said outer portion of said handle means, a key pawl pivotally coupled to said key for engaging said ratchet teeth, means for normally urging said key pawl into engagement with said ratchet teeth to prevent said key from rotating in said first direction relative to said handle means but allowing said key to rotate in said second direction relative to said handle until said lug engages said stop to allow the operator to change the start position of the router motor assembly and hence of said cutting tool, said key pawl being movable out of engagement with said ratchet teeth such that key may be rotated in said first direction relative to said handle to allow the operator to reposition said lug.

* * * * *